(12) United States Patent
Leiseder (10) Patent No.: US 10,408,273 B2
(45) Date of Patent: Sep. 10, 2019

(54) CARDAN SHAFT

(71) Applicant: Ulrich Leiseder, Reinbek (DE)

(72) Inventor: Ulrich Leiseder, Reinbek (DE)

( * ) Notice: Subject to any disclaimer, the term of this patent is extended or adjusted under 35 U.S.C. 154(b) by 268 days.

(21) Appl. No.: 15/503,751

(22) PCT Filed: Aug. 14, 2015

(86) PCT No.: PCT/EP2015/068799
§ 371 (c)(1),
(2) Date: Feb. 14, 2017

(87) PCT Pub. No.: WO2016/024022
PCT Pub. Date: Feb. 18, 2016

(65) Prior Publication Data
US 2017/0276184 A1   Sep. 28, 2017

(30) Foreign Application Priority Data

Aug. 14, 2014 (DE) .................... 20 2014 006 537 U (51) Int. Cl.
*F16D 3/18* (2006.01)
*F16D 3/44* (2006.01)

(52) U.S. Cl.
CPC ............... *F16D 3/185* (2013.01); *F16D 3/44* (2013.01); *F16D 3/18* (2013.01)

(58) Field of Classification Search
CPC ............... F16D 3/18; F16D 3/185; F16D 3/44
USPC .................................................. 464/150, 151
See application file for complete search history.

(56) References Cited

U.S. PATENT DOCUMENTS

| 1,491,763 A | 4/1924 | Warhus | |
| 1,921,737 A * | 8/1933 | Fenaille | F16D 3/34 |
| | | | 464/151 |
| 2,171,059 A * | 8/1939 | De Coudres | F16D 3/44 |

FOREIGN PATENT DOCUMENTS

| BE | 344396 A | 9/1927 | |
| DE | 617356 * | 8/1935 | ............ 464/151 |
| EP | 2408985 A1 | 1/2012 | |
| WO | 2005/037590 A2 | 4/2005 | |
| WO | 2011/117412 A1 | 9/2011 | |

* cited by examiner

*Primary Examiner* — Greg Binda
(74) *Attorney, Agent, or Firm* — Richard M. Goldberg (57) ABSTRACT

A connecting arrangement for connecting two parts (1, 5) by way of two connected sockets (2, 4), wherein parts and sockets have rotationally symmetrical engagement regions, not exceeding 180°, about engagement axes (11, 15 or 12, 14), which engagement regions are complementary between one part and one socket each, wherein one socket is rotated into one part each, and the complementary engagement regions hold the part on its socket so as to be pivotable about the respective aligned engagement axes and so as to withstand tensions in the direction of a zenith axis of the parts (10 or 16), and in that, after the parts and socket pairs are rotated into engagement and positioned with respect to each other, the sockets (2, 4) are connected to each other, the connection being rotationally and tensionally stiff with respect to the direction of the zenith axes.

10 Claims, 6 Drawing Sheets

CARDAN SHAFT

BACKGROUND OF THE INVENTION

Technical Field: Joints, Couplings and Connections

The invention relates to a buildable connection of two parts which have large surface torques of inertia, as required among others by drive systems where they form a joint with angle error correction; the invention further relates to a Cardan shaft having such a connection.

PRIOR ART

Couplings and joints for connecting two parts are known in a large variety.

Cardan joints transmit torques between shaft portions that are angled relative to one another, the transmission being achieved by forks via a cross pin. Therein, the pins of the cross pin are bent relative to the center of the cross which transmits the force onto the pair of pin and fork on the output side. This results in a high load on the base portions of the pins at the center of the cross. Inserting the cross pin into the forks requires space for the insertion into the bearing socket, as well as the use of plug-on sleeves or split bearing sockets. Only in simple applications can thin and therefore bendable tubes, which carry the bearing sockets, be pushed over the pins of the cross pin. Although the Cardanic error between the input and output sides is compensated in the Cardan shaft in W- or Z-configuration, the center part which is subject to oscillating oscillations is still critical and needs to have among others a particularly low mass.

Homokinetic joints (with balls) of the Rzeppa type transmit forces without Cardanic error but require large radial dimensions which are a multiple of the diameter of the driving shaft. The balls transmit the load under shear stress.

WO 2011/117412 discloses buildable bearings for high tension forces. EP 2408985 shows a construction for machine assemblies wherein multi-part components are engaged one in the other by rotation about their line of connection.

SUMMARY OF THE INVENTION

It is an object of the invention to provide a high performance connection with angle error correction which can be built easily, as well as the use of such a connection in a built Cardan shaft. This object is achieved with the features indicated in the claims.

If there is another object of the invention to provide a high-performance connection between two parts. This object is achieved with the features indicated in the claims.

A joint with angle error correction normally combines a pivotal movement away from the line of connection with a connection of the drive input and output sides, which connection is rotationally and tensionally stiff about the line of connection. The two crossbred axes of a general Cardan joint are established separately for each side in accordance with the invention. Therein, rotationally symmetric and form-fitting complementary engagement structures which are formed on the inner and outer surfaces of sockets and semi-spheres, respectively, and which hold the socket to be rotatable on the complementary saddle transmit the forces on large radii and via large surfaces. A self-restraining pivotal joint is formed for each side.

The engagement structures are undercut per side in cylindrically peripheral and axial direction and thereby bear torques as well as tension forces, and they are preferably undercut also in spherically radial directions relative to the center of the joint. The latter feature prevents the connecting part to be expanded and lifted off from its socket directly at the location of the joint, whereas, in a conventional design, this requires a stiffer, and therefore thicker body of the bearing sockets.

The rigid connection of the two sides can be achieved in a conventional way, or preferably for assembling and coupling by means of a latch and engagement structure of the same type and used for the pivotal movement. Free spaces prevent collisions of the two parts during a pivotal movement. In the extreme, a built, rotationally stiff connection without free space and, consequently, without a range of pivotal movement can be established to serve as a coupling.

In order to enable the assembly, all engagement structures of the parts are configured as sectors extending over an angle of maximally 180°.

In a joint, this has on the one hand the advantage that central elements are avoided, and on the other hand that an overreach from the drive input side to the output side is avoided in the pivotal movement. The advantageous form-fit via small grooves which are provided in large numbers reduces peak stresses. Each of these advantages contributes independently to a more compact construction and lower weight. The invention will now be described in greater detail in conjunction with the drawings, wherein:

BRIEF DESCRIPTION OF THE DRAWINGS

FIGS. 1(*a*)-1(*d*) show a connection according to the invention;

FIGS. 3(*a*)-3(*b*) illustrate an application of the connection according to FIG. 1;

FIGS. 4(*a*)-4(*h*) illustrate the assembly of the connection according to FIG. 1;

FIGS. 6(*a*)-6(*b*) show another useful embodiment of the intermediate socket;

FIGS. 7(*a*)-7(*b*) show a closed bellows for one side of the connection;

FIGS. 8(*a*)-8(*b*) show another embodiment of the connection.

DETAILED DESCRIPTION

Figure 1:
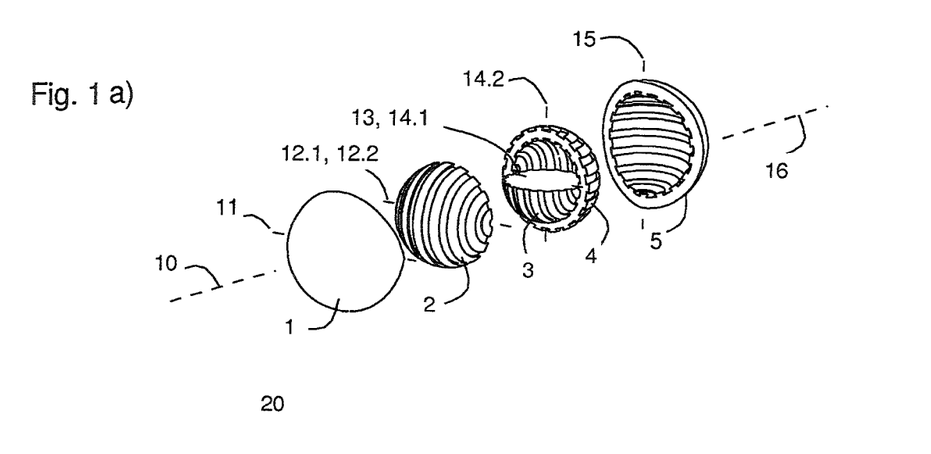
Figure 1C:
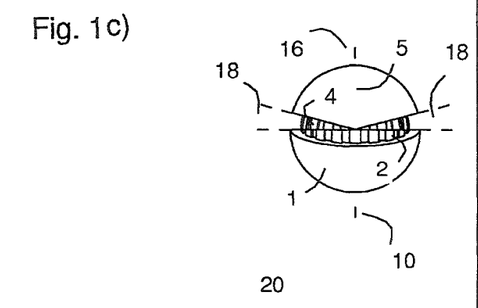
Figure 1D:
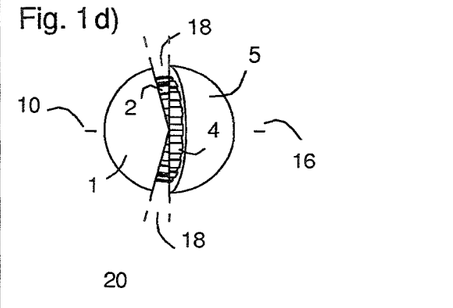
Figure 2:
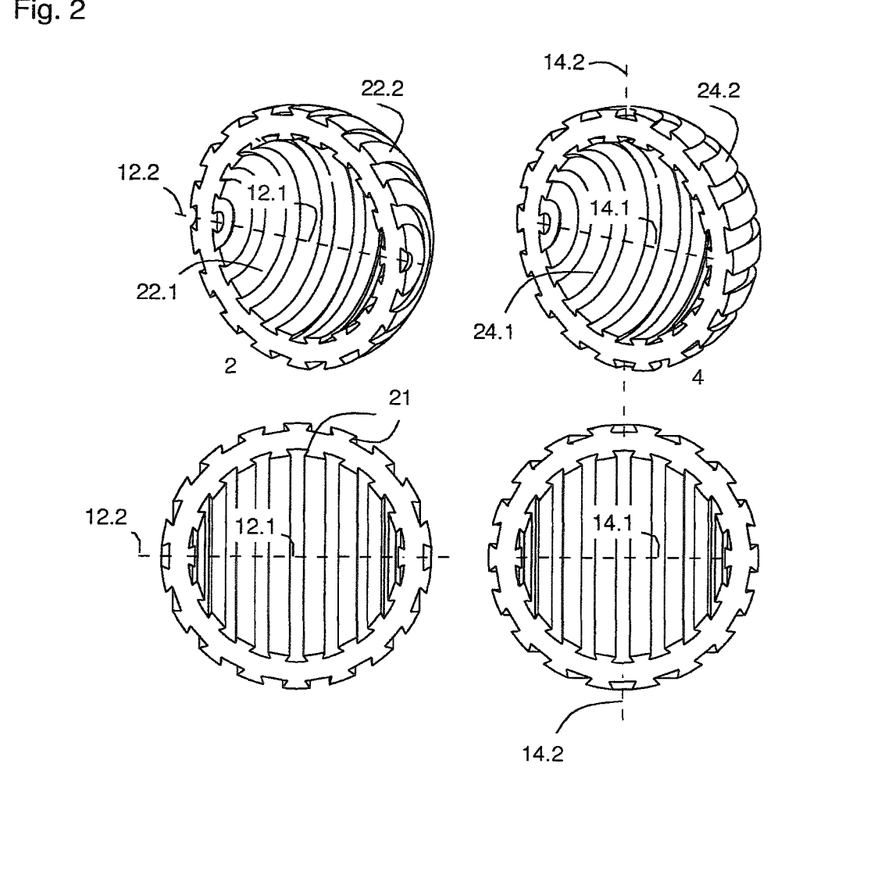
FIG. 2 is an enlarged view of the intermediate sockets shown in FIG. 1.
Figures 3, 3B:
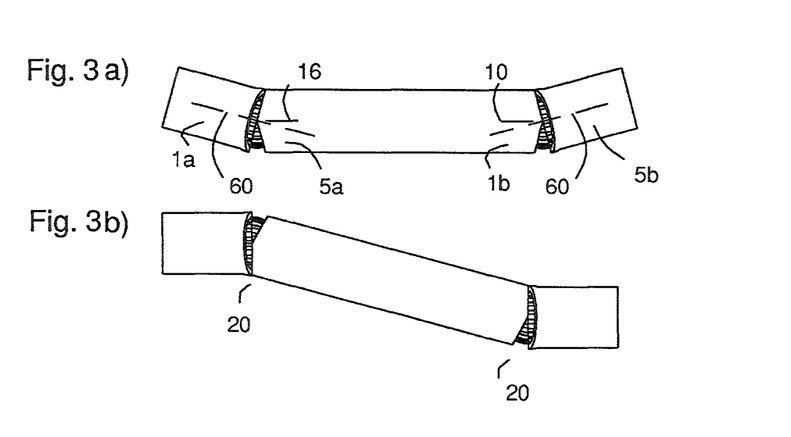

The synopsis in FIG. 1 shows an exploded view (1*a*), exploded with the exception of latch 3, of a connection 20 according to the invention, as well as a side view (1*b*), and the views of the assembled connection from above (1*c*) and from a side (1*d*). Associated with the individual parts are corresponding engagement axes (11 for 1, 12.1 and 12.2 for 2, 13 for 3, 14.1 and 14.2 for 4 and 15 for 5) as axis of symmetry for each engagement region, designated as ".1" for the internal side and as ".2" for the external side. The outer parts 1 and 5 are the parts to be connected. They have free spaces 18 (FIGS. 1*b*, 1*c*) and can therefore be rotated on their sockets 2 and 4, so that their zenith axes 10 and 16, respectively, are tilted relative to one another. Analogously, associated with each half shell or shell sector is a zenith axis which passes from the center through the center of the surface of the shell sector. The engagement axes of an item are orthogonal to the zenith axis. FIG. 3 illustrates such a tilting movement relative to the main axis 60 of the connection for a Cardan shaft as an example. FIG. 2 exemplifies the internal and external engagement regions 22.1 and 22.2 and 24.1 and 24.2 and their axes 12.1 and 12.2 and 14.1 and 14.2, respectively, for the sockets 2 and 4. In the other figures, the engagement regions have not been designated explicitly for reasons of clarity, and only the engagement axes have been designated. The engagement regions of the two sides of the shell can have skew engagement axes. In FIGS. 1 and 2, the engagement axes 14.1 and 14.2 of the socket 4 intersect orthogonally at the center of their enveloping sphere.

When rotated to the maximum degree, the parts 1 and 5 remain on their side of their socket, respectively, due to the free spaces 18. It is an advantage that the parts cannot encompass one another beyond the pivotal axis, as is the case for conventional fork sockets and pins in each position. Consequently, when suitably locked, the connection 20 can be separated even in the rotated condition, and it is also possible to remove intermediate parts in a string of connections, e.g. the center part of a Cardan shaft, radially, without having to move or displace the outer parts. This will be explained in detail as the description proceeds.

In order to bear torques, the parts 1, 5 and sockets 2, 4 and optionally sockets or, more preferably, latches 3 are respectively in engagement with one another via complementary pairs of tongues and grooves. The engagement regions are configured with rotational symmetry about their engagement axes 11 to 15 and thereby permit the rotation of the parts about the axes in pairs as half-shell system having an inner shell and an outer shell and aligned engagement axes and, when rotated into the engaged position, they form a semi-spherical stack. In the direction of the zenith axis, the grooves can form undercuts near the poles, so that they can bear tensional forces in the direction of that zenith axis and can hold the inter-engaged pairs of parts together. The grooves can also be configured as rotationally symmetric serrations.

The drawings show the sockets 2, 4 connected detachably to form a coupling, preferably via a latch 3 which has similar engagement structures as are provided between the parts and their sockets (1 with 2 and 4 with 5). However, the sockets 2 and 4 may also be fixed to one another permanently or detachably in a conventional manner after they have been rotated into engagement with the parts 1, 5 to be connected. The forces are transmitted from one side to the other only via the connection of the sockets 2, 4, which results in larger specific surface torques of inertia for the effective surfaces, as compared to a conventional fork and cross-pin pair. Moreover, this offers the advantageous possibility to adjust the damping achieved by the connection, preferably by the latch 3, to be decoupled from the guide action, for example by configuring the socket as a damping elastomer and configuring the engagement regions of the pairs of sockets and parts with suitable tribological pairing in hardened metal or plastics.

In another advantageous embodiment, for improving the rigidity of half-shells against one another, the grooves may have radially undercut profiles as to bear also radial forces pointing away from the center of the joint in any direction in space. In case of differential thermals expansions of the shells, this may prevent one shell from being lifted off from another shell locally or with spherical symmetry and from forming a spherically symmetric gap between these shells. FIG. 2 shows, in an isometric view and in a view into the interior of the sockets, grooves with undercut profiles 21 in dovetail configuration, in the enlargement of the sockets 2, 4 together with the different engagement axes 12.1, 12.2 and 14.1, 14.2, respectively, towards the inner and outer engagement regions 22.1, 22.2 and 24.1, 24.2, respectively. The profiles 21 of the grooves are distributed regularly on an arc segment.

The parts 1 and 5 have grooves around their engagement axes 11 and 15, respectively. The grooves on the inner circles engage in complementary grooves on the outer surface of the associated socket 2 or 4, as has been shown also in FIGS. 4g and 4h.

The parts 1 and 5 can have suitably designed bodies which integrate the shown engagement regions as connections. The two parts 1, 5 can have different free spaces or cut-outs. FIGS. 3a, 3b shows a Cardan shaft in known W- and Z-configurations with two integrated connections 20 as Cardan joints. The parts 1 and 5 are integrated in the shaft portions and designated as 1a, b and 5a, b, respectively. Since the parts 1 and 5 have an identical design in this case, the order in which they are designated is arbitrary. The advantage of having a slim body with only little disturbing structural parts can clearly be seen.

Figure 4:
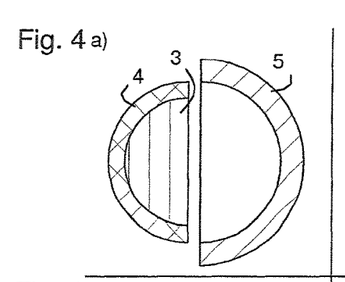

The process of assembling the connection 20 according to the invention as shown in FIG. 1 has been illustrated in FIG. 4. For clarity, the engagement regions have not been shown in the sectional views in FIGS. 4a to 4f, but they have been shown in the isometric view of the selected parts in FIGS. 4g and 4h. In FIGS. 4a to 4c, the socket 4 is positioned relative to the part 5 and rotated into engagement with the complementary engagement structures. The latch 3 has also been rotated into the socket 4 in advance and now participates in the rotation. In FIG. 4d, the stack formed by the part 1 and the socket 2, which has been assembled in the same way, is positioned to oppose the stack from FIG. 1c which has been completely rotated into engagement in this state, with the engagement structures being congruent to each other. The socket 2 has, on its inner side, the same engagement structures as the socket 4 and thus permits to accommodate the latch 3 in the same way as has been shown also in FIG. 2. FIG. 4e shows the latch 3 in the state rotated back by 90° after the pairs of stacks have been placed one against the other, so that the latch engages in both sides and connects them. The outer sockets 2 and 4 and the parts 1 and 5 are not brought into direct engagement with the corresponding parts on the other side. By providing suitable spaces it is even possible to avoid a direct contact, which could otherwise promote a canting when the parts are positioned radially. The sockets may be calottes. The latch 3 may also be configured as a sector of a semi-sphere, e.g. as a calotte, for embracing the parts.

The latch 3 can be supplemented by a second latch 3' so as to form a complete sphere, the second latch being in engagement with the socket 2 in the same manner as the first latch is engagement with the socket 4. Then, when the parts have been positioned as in FIG. 4d, both latches are rotated to engage and embrace the socket on the opposite side with twice the surface (4f and 4h), when the operating position has been reached. This also helps to avoid imbalances. FIGS. 4g and 4h show closed connections with part 1 and the socket 2 being not shown.

Figure 5:
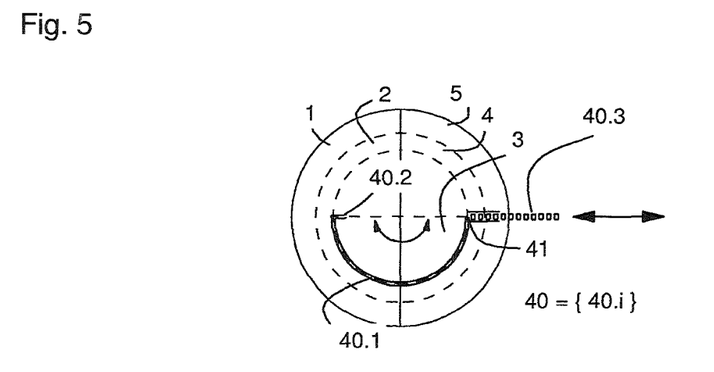
FIG. 5 shows an adjusting device for a coupling-type connection.

An adjusting and holding mechanism may serve for rotating the latch in the state where the parts are juxtaposed and for fixing the latch. FIG. 5 shows the latch 3, which establishes the connection, together with a multi-part adjusting and holding device 40 comprising a Bowden cable 40.1, a holder 40.2 and an actuator 40.3. When the latch is rotated into the socket 4, it can entrain the holder which has been inserted so far at the point 41. The adjustment may also be achieved with a tension cable for each direction of rotation in a similar manner as with the Bowden cable or by means of a drive wheel in frictional engagement or meshing engagement at the point 41. The latch may be fixed in position by means of elastic springs or claws acting between the latch and the socket in known manner. It is advantageous to provide access to the latch 3 through the outer socket 4 and the part 5, respectively at the zenith axis of the socket, so that the force-bearing surfaces are weakened as little as possible. Externally of the connection, the actuator 40.3 may be lead to the outside in an non-critical area. The access through the part 5 has to provide for the pivotal movement relative to the socket by corresponding free spaces. Then, it is possible to separate the connection even in the rotated position.

Since, in operation, the socket 4 does not rotate relative to the latch 3, the weakening of the outer part 5 may be kept small in certain applications by permitting access to the adjusting mechanism 40 only in the non-rotated orientation of the zenith axis 16 of the part 5. This avoids further free spaces in the part which would otherwise be needed.

Figure 6:
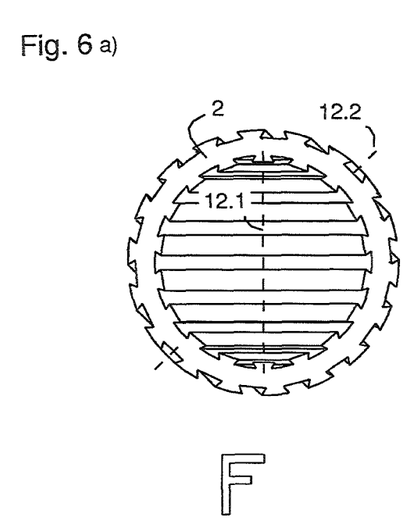

As has been mentioned already, the parts 1 and 5 may have an identical design in order to reduce the number of parts to be produced. This determines the outer engagement regions of the sockets 2 and 4. The inner engagement regions for the latch 3 can be equal to each other. In another embodiment the relative rotations of the engagement axes are not set to 0° for the engagement axes 12.1 and 12.2 of the socket 2 and to 90° for the engagement axes 14.1 and 14.2 of the socket 4, as has been shown in the previous embodiments, but they are both adjusted to 45° with offset in opposite sense (FIG. 6a). Since, in the connection, the sockets are rotated by 180° relative to one another, now, when the design of the sockets 2 and 4 is identical, the outer engagement axis 12.2 flips over to the axis 14.2, as has been shown in FIG. 6b in a simplified rear view of the axes without the socket 4 and with the axis 12.2 of the non-flipped socket 2 being shown in brackets. As before, they (12.2 and 14.2) cross each other at an angle of 90°, whereas the inner axes 12.1 and the 14.1 are aligned and the latch 3 can interconnect the sockets 2 and 4. The advantage is, that the entire connection consists only of two or—with the optional latch—three separate parts.

All the parts and items are configured, especially in their engagement regions, as sectors of rotation bodies with sector angles of at most 180° and can be manufactured, machined and processed without undercuts in the rotary direction. The parts can be molded and can be de-molded by rotation, or the mold can be removed per engagement region by rotation. The process corresponds essentially to the disassembly, wherein, for example, the socket 4 of FIGS. 1 and 2 is molded between the latch 3 and the part 1, when the latch is brought out of engagement by rotation about its engagement axis 13—it corresponds to the generated engagement axis 14.1—then the socket is rotated about the engagement axis of the part 5 which, by molding, corresponds to its engagement axis 14.2. Thus, all selected parts of the connection or Cardan shaft can advantageously be manufactured at low costs from plastics, optionally fiber-reinforced plastics, from injection-moldable ceramics or from other composite materials including moldable renewable commodities.

Further, it may be advantageous to compose all sockets 2, 4 and latches 3, 3' from a plurality of smaller sectors which are put together to form the final sector. Since, advantageously, the active surfaces are essentially offset from the main axis 60 of the connection, the connection can be configured as a tube-like hollow connection and may, after assembly, e.g. in hollow Cardan shaft, accommodate installations for, e.g. compressed air, oil, data, energy, inspection devices or cooling, which installations will then be protected in the interior and may be disposed centrally, co-rotating or stationary.

Figure 7:
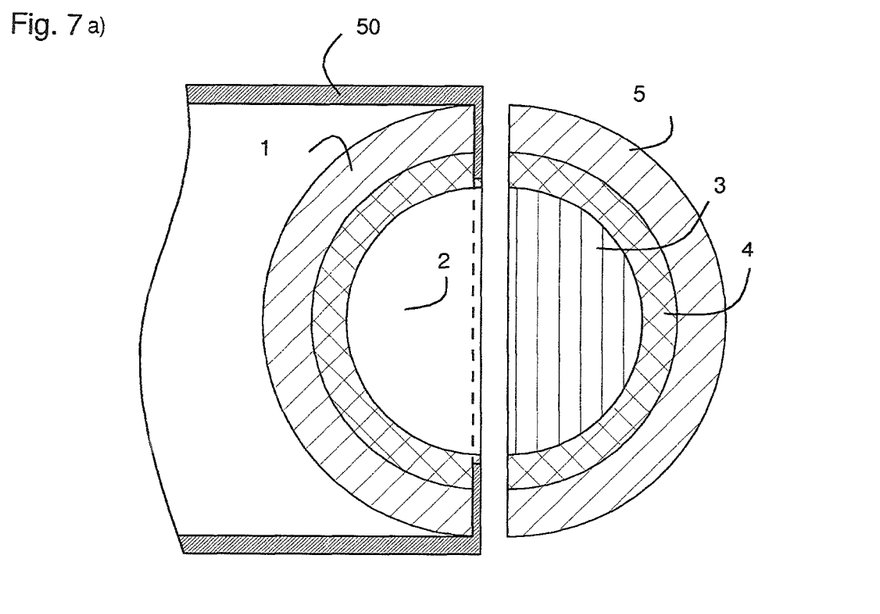

Since, advantageously, the pivotal movement does not reach over to the other side, the joint has three separate regions consisting of i) part 1 with outside of socket 2, ii) inside of socket 2 (with latch 3 and optionally 3') with inside of socket 4, and iii) outside of socket 4 with part 5. Thus, protective bellows or seals may be installed on one side such that they are not severed or opened when the connection is separated. The bellows or seals need to permit only the pivotal movement between the socket and the part on one side. Thus, lubricating or pressure areas in the vicinity of the joints may also be kept closed when the connection is separated. Lubricants cannot escape to the outside. FIG. 7 shows, simplified, a bellows 50 which seals against the socket 2 and encompasses the part 1 in the state where the connection is separated (7a) and in a state where the connection is established (7b), without interfering with the space for the latch 3. Advantageously, the central region (point ii) above) seals the latches against dirt and humidity in operation. A simple seal ring between the sockets is sufficient for that purpose.

A useful application of the encapsulated halves comprise hygienic separations or gas- or fluid-tight locks. Advantageous is the possibility to easily clean the decomposable connection and its easy assembly, also from a radial direction, even in the pivoted state.

Figure 8:
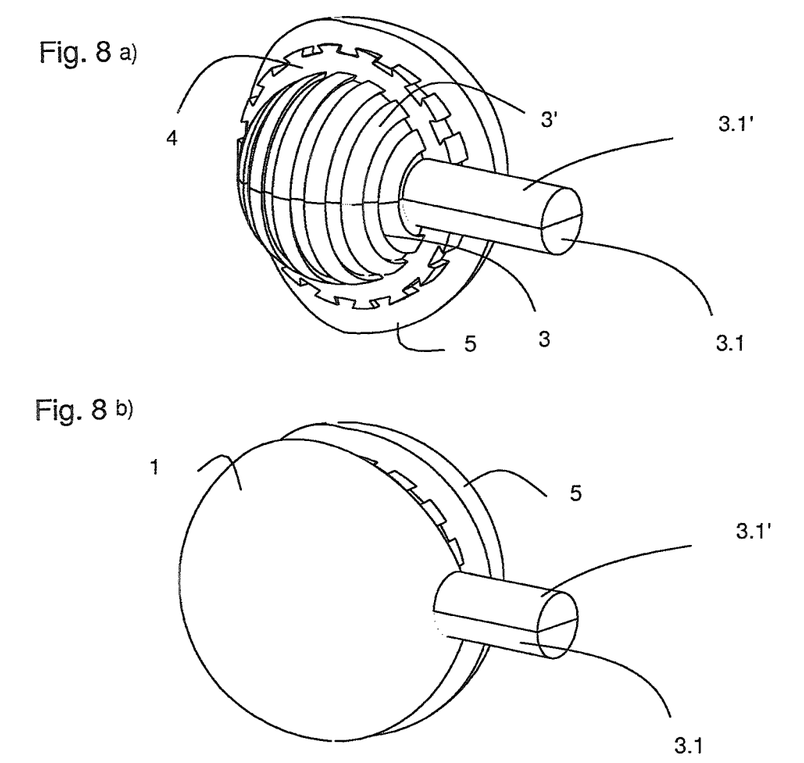

FIG. 8a shows an embodiment of the connection in which the latches 3, 3' each have a cylindrical stud 3.1, 3.1' projecting to the outside and passing rotatably through recesses in the other parts, which serves for i) locking, as well as ii) as a separate connector for a third direction, or iii) as a third and fourth, respectively, connected member. In FIG. 8, all parts hold together. In FIG. 8b the front side is also fully occupied.

What is claimed is:

1. A connecting arrangement comprising:
    two parts,
    two sockets for connecting the two parts, the two sockets being detachably connected to each other,
    wherein the parts and sockets have rotationally symmetrical engagement regions, not exceeding 180°, about engagement axes, which engagement regions are complementary between one part and one respective socket,
    wherein one socket is rotated into one respective part, and complementary ones of the engagement regions hold the part on its respective socket so as to be pivotable about respective aligned ones of the engagement axes and so as to withstand tensions in a direction of zenith axes of the parts, and
    wherein, after the parts and socket pairs are rotated into engagement and positioned with respect to each other, the sockets are connected to each other with a connection which is rotationally and tensionally stiff with respect to the direction of the zenith axes.

2. The arrangement according to claim 1,
    further comprising a first latch for connecting the sockets to each other and which has an engagement region N that is rotationally symmetric with respect to an engagement axis,
    wherein the sockets have, on an inside thereof, a further engagement region about engagement axes thereof, the further engagement region being complementary to the engagement region of the latch, and wherein the engagement axes of the sockets and of the latch are aligned and the latch is fully rotated into one said socket before positioning and, after positioning, is adapted to be rotated about its engagement axis so as to embrace both sockets.

3. The arrangement according to claim 2, further comprising a second latch, wherein the second latch has engagement regions with profiles identical with those of the first latch, said second latch engaging a free said socket before positioning and, after rotation, embracing both sockets together with the first latch.

4. The arrangement according to claim 2, wherein at least one of the following is composed of a plurality of parts:
   at least one said part,
   at least one said socket and
   the latch.

5. A coupling comprising a connecting arrangement according to claim 2, further comprising an adjusting device for rotating the latch about its engagement axis which results in coupling of the sockets.

6. The arrangement according to claim 1, wherein the engagement axes of the sockets are rotated by 90° relative to their zenith-axes.

7. A Cardan shaft comprising two angle error-correcting joints, wherein at least one of the joints is formed by the connecting arrangement according to claim 1.

8. The Cardan shaft according to claim 7, wherein the parts include hollow tubes.

9. The Cardan shaft according to claim 7, wherein each socket constitutes an intermediate part disconnected from a respective one of a drive input shaft and a drive output shaft to provide that there is no direct connection between the drive input shaft and drive output shaft which pivot in operation.

10. A connecting arrangement comprising:
   a first part and a second part,
   a socket for interconnecting the first part to the second part,
   wherein the parts and the socket have rotationally symmetrical engagement regions, not exceeding 180°, about engagement axes, which engagement regions are complementary between the parts and sides of the sockets facing the parts,
   wherein the socket includes a concave engagement region which is internally in engagement with the second part and a convex engagement region which is externally in engagement with the first part, and
   wherein the complementary engagement regions hold the parts on the socket so as to be pivotable about respective aligned engagement axes and so as to be tensionally and rotationally stiff in a direction of a zenith axis.

* * * * *